United States Patent
Kim et al.

(10) Patent No.: US 12,466,081 B2
(45) Date of Patent: Nov. 11, 2025

(54) SEALER WORK AUTOMATION SYSTEM USING ROBOT AND ITS METHOD

(71) Applicants: Hyundai Motor Company, Seoul (KR); Kia Corporation, Seoul (KR)

(72) Inventors: Kyoung Hye Kim, Suwon-si (KR); Kwangro Choi, Gwangju (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 35 days.

(21) Appl. No.: 18/643,259

(22) Filed: Apr. 23, 2024

(65) Prior Publication Data
US 2025/0073913 A1    Mar. 6, 2025

(30) Foreign Application Priority Data
Sep. 1, 2023 (KR) .......... 10-2023-0116039

(51) Int. Cl.
*B25J 11/00* (2006.01)
*B25J 9/16* (2006.01)
*B62D 65/00* (2006.01)

(52) U.S. Cl.
CPC ......... *B25J 11/0075* (2013.01); *B25J 9/1664* (2013.01); *B25J 9/1697* (2013.01); *B62D 65/00* (2013.01)

(58) Field of Classification Search
CPC .... B25J 11/0075; B25J 9/1664; B25J 9/1697; B25J 9/1684; B25J 11/0085; B25J 9/1679; B25J 9/1612; B25J 13/08; B25J 15/0019; B25J 15/0441; B25J 19/02; B62D 65/00; B05C 1/06; B05C 11/1015; B05D 1/28

See application file for complete search history.

(56) References Cited

U.S. PATENT DOCUMENTS

| | | | | |
|---|---|---|---|---|
| 6,213,667 B1* | 4/2001 | Isaac | ............ | A46B 11/063 401/289 |
| 6,666,925 B2* | 12/2003 | Brackett | ............ | A46B 17/06 15/21.1 |
| 8,051,796 B2* | 11/2011 | Clifford | ............ | B05B 13/0431 901/29 |
| 8,938,843 B2* | 1/2015 | Junkins | ............ | B08B 11/00 15/236.08 |
| 2004/0139994 A1* | 7/2004 | Drukarov | ............ | B44D 3/006 134/198 |
| 2025/0214246 A1* | 7/2025 | Gavrilin | ............ | B25J 11/0075 |

* cited by examiner

*Primary Examiner* — Robert T Nguyen
(74) *Attorney, Agent, or Firm* — Slater Matsil, LLP (57) ABSTRACT

An embodiment sealer work automation system includes a robot configured to perform a brushing work of spreading a sealer applied to a joint by moving a brushing work tool to a work location of an under body, a three-dimensional (3D) sensor mounted on the robot and configured to photograph a work portion of the joint to acquire 3D data, a residual sealer remover configured to remove a residual sealer by applying a physical force to a brush of the brushing work tool contaminated after the brushing work, a robot path generator configured to generate a robot path for the brushing work by matching the 3D data received from the 3D sensor and design data for the brushing work of the joint, and a robot controller configured to control an overall operation of the robot and to control the brushing work of the robot based on the robot path.

20 Claims, 9 Drawing Sheets

SEALER WORK AUTOMATION SYSTEM USING ROBOT AND ITS METHOD

CROSS-REFERENCE TO RELATED APPLICATIONS

This application claims the benefit of Korean Patent Application No. 10-2023-0116039, filed on Sep. 1, 2023, which application is hereby incorporated herein by reference.

TECHNICAL FIELD

The present invention relates to a sealer work automation system using a robot and its method.

BACKGROUND

In general, in the sealing factory of the vehicle, a large amount of parts are performing a sealer work of applying a sealer to joints of an assembled under body. The sealer work is for watertightness and vibration noise alleviation of the under body and is conducted by a manual work in which a worker applies the sealer along the joints with a brush in the related art.

However, the sealer work in the related art has a problem in that sealer pushing and sealer holes are generated according to a skill of the worker, and a bad quality is caused due to a human error such as a poor brushing mark surface. In addition, since the worker should conduct a repeated brushing work while looking up due to work characteristics for the under body, there is a problem in that a musculoskeletal system has high fatigue and an injury is caused. Therefore, a method for automating a sealer brushing work of the under body is required.

The above information disclosed in this background section is only for enhancement of understanding of the background of embodiments of the invention and therefore it may contain information that does not form the already known prior art.

SUMMARY

The present invention relates to a sealer work automation system using a robot and its method. Particular embodiments relate to a sealer work automation system for applying a sealer in a lower part of a vehicle body and its method.

An exemplary embodiment of the present invention has been made in an effort to provide a sealer work automation system using a robot and its method, which perform a brushing work of applying a sealer to joints of a vehicle body using a robot equipped with a brushing work tool, and at the same time, automate all of residual sealer removal, brush state examination, and an old brush replacement work for maintaining of a brush state to provide a precise and uniform sealer finishing quality.

An exemplary embodiment of the present invention provides a sealer work automation system using a robot that includes a robot performing a brushing work of spreading a sealer applied to a joint by moving a brushing work tool to an under body, a 3D sensor mounted on the robot and photographing a work portion of the joint to acquire 3D data, a residual sealer remover removing a residual sealer by applying a physical force to a brush of the brushing work tool contaminated after the brushing work, a robot path generator generating a brushing work robot path by matching the 3D data received from the 3D sensor and design data for the brushing work of the joint, and a robot controller controlling an overall operation of the robot and controlling the brushing work of the robot based on the robot path.

Further, the brushing work tool may include a brush constituted by a brush hair having a form in which a front is flat and a brush handle extending from the brush hair in a longitudinal direction, a main changer attached to the robot, and including a first magnet in a lower part and a sub changer mounted on or detached from the main changer by a wireless switching scheme using a second magnet configured in an upper part while coupling the brush through a gripper.

Further, the 3D sensor may scan a work portion through a 3D scan camera capable of recognizing a depth to generate the 3D data and transfer the generated 3D data to the robot path generator to recognize a shape of the work portion and a joint to which a sealer is applied.

Further, the robot may control a scan angle of the 3D sensor by rotating an end effector according to the work portion and control an angle of a flat brush in a brushing direction of the joint by rotating the end effector upon the brushing work.

Further, the residual sealer remover may include a first sealer removal module configuring a bar horizontally fixed to an inner wall of a housing of which a top is opened and horizontally moving to primarily remove a residual sealer of a physically contacted brush and a second sealer removal module secondarily removing the sealer and restoring a brush form by an operation of raising the brushing work tool while physically pressing a front and a back of the brush by using urethane blocks facing each other in a horizontal direction.

Further, the second sealer removal module may include a plurality of urethane blocks facing each other in a taper form tilted downwards, movable bodies coupling the urethane blocks, respectively, and moving to the left and right, and an actuator driving the urethane blocks in opposite directions through screws connected to the respective movable bodies.

Further, the sealer work automation system may further include a brush examiner photographing front and side images of a brush from which the residual sealer is removed to judge whether a brush state is normal (OK/NG) based on image sensing and a tool replacer recovering an existing brushing work tool judged to be defective (NG) from the robot and supplying a new brushing work tool and replacing the existing brushing work tool.

Further, the brush examiner may include a box of which a top is opened to form a box-type space, a first camera photographing a front image of a brush positioned at a center, and a first backlight emitting light from a rear surface of the brush, which are installed on vertical side surfaces of the box, respectively, a second camera photographing a side image of the brush, and a second backlight emitting light from the other side of the brush.

Further, the first camera and the second camera may measure the number of pixels and a brush area of the brush by using a brightness difference by the backlight in the respective photographed images and judge whether the brush state is normal (OK/NG) according to whether the number of pixels and the brush area satisfy reference values for each of a plurality of divided sensing areas in the image.

In addition, the first camera and the second camera may judge that the brush state is normal when a first condition of judging that the brush state is normal when the brush area is within an allowed sensing area, a second condition of judging that the brush state is normal when only one brush area is detected in one sensing area, and a third condition of judging that the brush state is normal when the number of pixels of the brush area for each sensing area satisfies a set reference value are all satisfied.

Further, the tool replacer may include a plurality of tool stands horizontally disposed in a T-shaped support and forming a seating structure of the brushing work tool and a proximity sensor sensing whether the brushing work tool is seated for each tool stand and transferring whether the brushing work tool is seated for each tool stand to the robot controller.

In addition, the robot path generator may generate a 3D model that sets a robot path required for a brushing work of a vehicle body by using a vision program by a preliminary setting work for the brushing work, calculates a correction value according to generation of a matching error by preprocessing the 3D data received upon an actual brushing work and then matching the 3D model, displays a predefined robot path at a work portion area of the 3D data, and corrects coordinates of the robot path according to a location of the work portion area of the vehicle body.

Further, the robot path generator may provide a graphical user interface (GUI) which simplifies modification of a robot path of a user (engineer) by using off-line programming (OLP), may derive a teaching point in 3D data using the GUI, and may provide a precise teaching and robot path modification function for each work portion desired by a user.

In addition, the robot path generator may form a normal coordinate value of a specific point or a desired position for a primary watertight portion work left surface of the vehicle body through the GUI and may modify at least one of a teaching point angle, a brush depth, and a brush rotation angle based on the normal coordinate value to support a precise control of simulating a brushing work skill of a skilled worker.

In addition, the robot controller may generate a control signal based on the robot path received from the robot path generator to control the brushing work of the robot and may control at least one operation of a residual sealer removal mode, a brush state examination mode, and a tool replacement mode of the robot for maintenance of the brush state after completing the brushing work.

Meanwhile, another exemplary embodiment of the present invention provides a sealer work automation method using a robot that includes moving a brushing work tool and a 3D sensor mounted on a robot to a work location of an under body and photographing a work portion of a joint through the 3D sensor to acquire 3D data, generating a robot path by matching the 3D data and a 3D model for a brushing work of the joint, controlling a brushing work of spreading a sealer applied to the joint by moving the brushing work tool along the robot path, moving the brushing work tool to a residual sealer remover to remove a residual sealer stained in a brush and restore a brush form when the brushing work is completed, photographing, by a brush examiner, front and side images of the brush to judge whether a brush state is normal (OK/NG) based on image sensing, and when judging that the brush state is defective (NG), moving a defective brushing work tool to a tool replacer, detaching the defective brushing work tool by a magnetic scheme, then replacing the defective brushing work tool with a new brushing work tool, and mounting the new brushing work tool.

Further, the generating of the robot path may include a preliminary setting work step of generating a 3D model which sets a robot path required for the brushing work of the vehicle body by using a vision program, performing a preprocessing work of extracting a work portion area from the 3D data and removing unnecessary data upon the brushing work, matching a 3D model corresponding to the preprocessed 3D data in 3D to calculate a correction value according to generation of a matching error, displaying a predefined robot path in the work portion area of the 3D data, and correcting coordinates of the robot path according to a location of the work portion area of the vehicle body.

Further, the removing of the residual sealer and restoring the brush form may include primarily removing a residual sealer stained in the brush by physically contacting the brush with a horizontally fixed bar of a first sealer removal module and secondarily removing the sealer and restoring a brush form by an operation of raising the brushing work tool while physically pressing a front and a back of the brush by using urethane blocks facing each other in a horizontal direction of a second sealer removal module.

Further, in the judging of whether the brush state is normal (OK/NG), the number of pixels and a brush area of the brush may be measured for each of the front image and the side image, and it may be judged whether the brush state is normal (OK/NG) according to whether the number of pixels and the brush area satisfy reference values for each of a plurality of divided sensing areas in the image, and it may be judged that the brush state is normal when a first condition of judging that the brush state is normal when the brush area is within an allowed sensing area, a second condition of judging that the brush state is normal when only one brush area is detected in one sensing area, and a third condition of judging that the brush state is normal when the number of pixels of the brush area for each sensing area satisfies a set reference value are all satisfied.

Further, the replacing and mounting may include moving the robot to an empty tool replacer, mounting/detaching a defective brushing work tool on/from an empty first tool stand, moving the robot to a second tool stand, mounting a new brushing work tool, and returning the robot to a home location.

According to an exemplary embodiment of the present invention, there is an effect in which a precise brushing work is controlled through a corrected robot path by mounting a brushing work tool optimized for a brushing work of a sealer on a robot and using a 3D sensor to reduce the existing manual work manpower and uniformize a sealer finishing quality.

Further, there is an effect in which removal of a residual sealer stained in a brush, brush state examination, and an old brushing work tool replacement and mounting process are automated to maintain a form of the brush in a state optimized for the brushing work.

Further, an effect can be expected in which the brushing work tool is automatically replaced wirelessly by using a tool changer adopting switching magnetic technology to reduce a replacement time and increase process operation efficiency.

DETAILED DESCRIPTION OF ILLUSTRATIVE EMBODIMENTS

Hereinafter, exemplary embodiments of the present invention will be described in detail so as to be easily implemented by those skilled in the art, with reference to the accompanying drawings.

The terms used herein are only for describing specific exemplary embodiments and are not intended to limit the present invention. As used here, the singular forms are also intended to include plural forms, unless they are explicitly differently indicated by context. It will be appreciated that when the terms "include" and/or "including" are used in this specification, the terms "include" and/or "including" are intended to designate the existence of mentioned features, integers, steps, operations, constituent elements, and/or components, but they do not exclude the existence or addition of one or more other features, integers, operations, constituent elements, components, or groups thereof. As used here, the terms "and/or" include any one or all combinations of the items which are associated and listed.

Throughout the specification, terms including first, second, A, B, and the like are used for describing various constituent elements, but the constituent elements are not limited by the terms. These terms are just intended to distinguish the components from other components, and the terms do not limit the nature, sequence, or order of the components.

It should be understood that, when it is described that a component is "connected to" or "accesses" another component, the component may be directly connected to or access the other component or a third component may be present therebetween throughout the specification. In contrast, it should be understood that, when it is described that a component is "directly connected to" or "directly accesses" another component, it is understood that no element is present between the element and another element.

Throughout the specification, terms are used only to describe specific exemplary embodiments, and they are not intended to limit the present invention. A singular expression includes a plural expression if there is no clearly opposite meaning in the context.

Additionally, it is appreciated that one or more of at least one of the following methods or aspects thereof can be executed by one or more controllers. The term "controller" may refer to a hardware device including a memory and a processor. The memory is configured to store program instructions, and the processor is particularly programmed to execute the program instructions in order to perform one or more processes which are described below in more detail. As disclosed here, the controller may control units, modules, parts, devices, or operations of those similar thereto. Further, as recognized by those skilled in the art, it is appreciated that the following methods may be executed by a device including the controller jointly with one or more other components.

Hereinafter, a sealer work automation system using a robot and its method according to an exemplary embodiment of the present invention will be described in detail with reference to the accompanying drawings.

Figure 1:
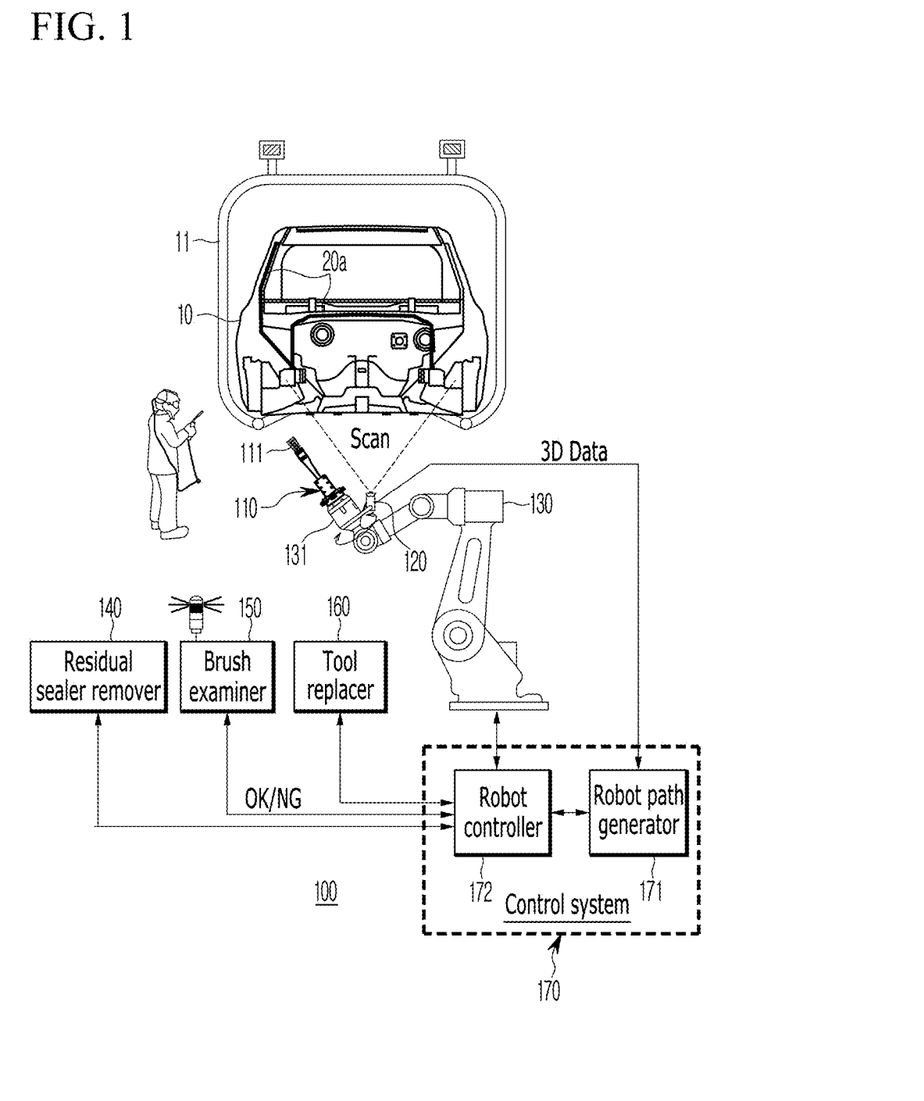
FIG. 1 is a diagram schematically illustrating a sealer work automation system according to an exemplary embodiment of the present invention.

FIG. 1 schematically illustrates a sealer work automation system using a robot according to an exemplary embodiment of the present invention.

Figure 2:
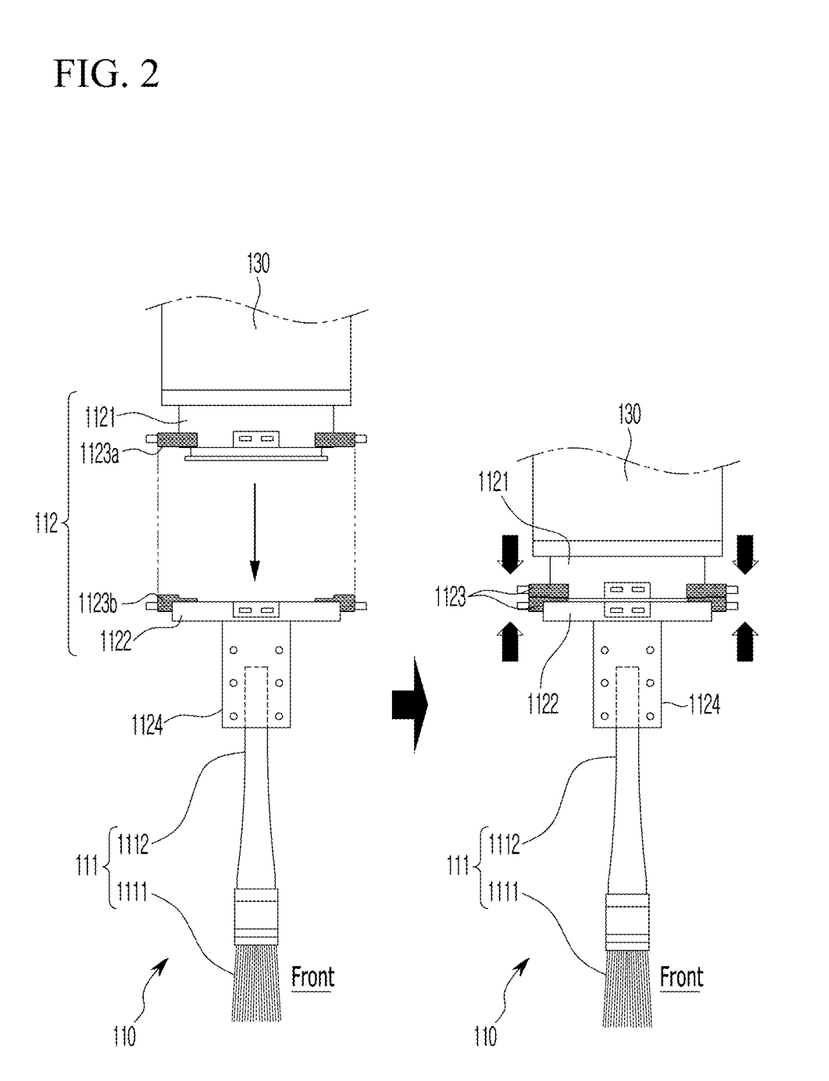
FIG. 2 illustrates a brushing work tool and a replacement structure according to an exemplary embodiment of the present invention.

FIG. 2 illustrates a brushing work tool and a replacement structure according to an exemplary embodiment of the present invention.

Referring to FIGS. 1 and 2, the sealer work automation system 100 using a robot according to an exemplary embodiment of the present invention includes a robot 130 spreading a sealer 20a applied to a joint through a brushing work by moving a brushing work tool 110 to a lower part of a vehicle body 10, a 3D sensor 120 mounted on the robot 130 and acquiring 3D data by scanning a designated joint work portion, a residual sealer remover 140 removing a residual sealer by applying physical force to a contaminated brush 111 after the brushing work, a brush examiner 150 photographing front and side images of the brush 111 from which the residual sealer is removed and determining whether a brush state is normal (OK/NG) based on image sensing, a tool replacer 160 replacing an existing brushing work tool 110 determined to be NG after brush examination with a new brushing work tool 110, a robot path generator 171 matching 3D data received from the 3D sensor 120 and design data for the brushing work of the joint and generating a robot path for the brushing work, and a robot controller 172 controlling an overall operation of the robot 130 for the brushing work based on the robot path.

The brushing work tool 110 and the 3D sensor 120 are mounted to be rotatable around an end effector 131 of a multi-joint robot 130. The robot 130 may secure the degree of freedom for a precise brushing work of the brushing work tool 110 with 7 axes or more.

In embodiments of the present invention, brushing work automation means a sealer finishing work in which the robot 130 uniformly spreads the sealer 20a through brushing by moving the brush 111 of the brushing work tool 110 and precisely sealing processes a joint portion while applying the sealer 20a to the joint.

Therefore, the sealer work automation system 100 includes a brush 111 optimized for brushing, which is made of the sealer 20a in order to implement a brushing work having a precise and uniform quality through the robot 130, and aims at providing maintenance and replacement management of a brush state, robot teaching including a robot path, and sophisticated robot control based thereon.

The brushing work tool 110 includes the brush 111 and a tool changer 112.

The brush 111 is constituted by a brush hair 1111 in which a front is flat and a brush handle 1112 extending from the brush hair 1111 in a longitudinal direction.

The brush hair 1111 may be configured by an acryl artificial hair optimized for brushing work automation as compared with existing pig hair, wool, and silicon hera by comprehensively considering sealer pressability, brushing uniformity, a brushing quality, durability, and unit price. The brush hair 1111 is a core component of the brush 111 and substantially represents the symbolism and characteristics of the brush 111 itself. Accordingly, hereinafter, the brush 111 should be appreciated to substantially refer to or mean the brush hair 1111 as long as there is no separate description throughout the specification.

The tool changer 112 includes a main changer 1121 attached to the robot 130 and having a first magnet 1123a in a lower part and a sub changer 1122 mounted on (ON) or detached (OFF) from the main changer 1121 by a wireless switching scheme using a second magnet 1123b configured in an upper part while coupling the brush 111 through a gripper 1124.

The first magnet 1123a and the second magnet 1123b may be collectively referred to as a magnetic 1123 and may be mounted/detached by an electrical switching signal (ON/OFF). The gripper 1124 may fasten and couple the brush handle 1112 through a coupling member such as a screw/bolt while inserting the brush handle 1112 into an inner space.

The 3D sensor 120 scans a work portion through a 3D scan camera capable of recognizing a depth to generate 3D data. The 3D sensor 120 transfers the generated 3D data to the robot path generator 171 to recognize a shape of the work portion and the joint to which the sealer 20a is applied.

The robot 130 rotates the end effector 131 according to the work portion to control a scan (photographing) angle of the 3D sensor 120. Further, the robot 130 rotates the end effector 131 upon the brushing work to control an angle of the flat brush 111 according to a brushing direction of the joint.

The robot 130 performs the brushing work by moving the brushing work tool 110 to a designated joint location according to a mechanical motion control (also referred to as a posture control) of the robot controller 172.

Meanwhile, a maintenance and replacement management system of the brush state is described.

When the brushing work of the designated joint is completed, the robot 130 moves the brushing work tool 110 to the residual sealer remover 140 to remove a residual sealer 20b stained in the brush 111 and restore a form of the brush 111.

Figure 3:
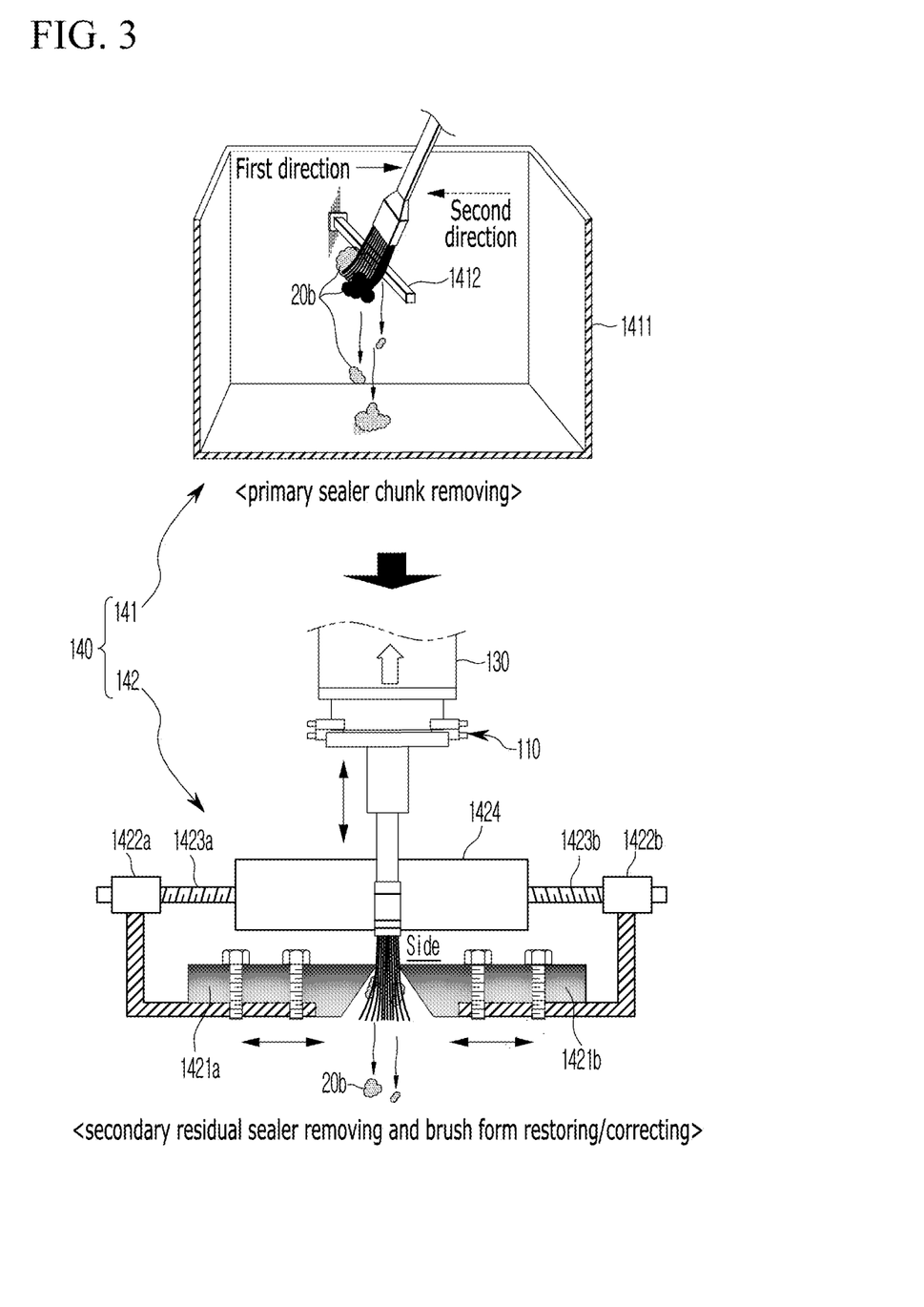
FIG. 3 illustrates a configuration of a residual sealer remover according to an exemplary embodiment of the present invention.

FIG. 3 illustrates a configuration of a residual sealer remover according to an exemplary embodiment of the present invention.

Referring to FIG. 3, the residual sealer remover 140 according to an exemplary embodiment of the present invention includes a first sealer removal module 141 and a second sealer removal module 142 which continuously remove the residual sealer 20b of the brush 111 contaminated due to the residual sealer 20b after the brushing work.

The first sealer removal module 141 configures a bar 1412 horizontally fixed to an inner wall of a housing 1411 of which a top surface is opened and horizontally moves and primarily removes a chunk of the residual sealer 20b of a physically contacted brush 11. In this case, the robot 130 reciprocates the brushing work tool 110 in a first direction (e.g., a right side) and a second direction (e.g., a left side) in a posture of tilting the brushing work tool 110 at a predetermined angle toward the bar 1412 to remove the residual sealer 20b stained on a front and a back of the brush 111. The removed residual sealer 20b falls to a floor by gravity.

The second sealer removal module 142 secondarily removes the sealer and restores the brush form by an operation of raising the brushing work tool while physically pressing the flat front and back of the brush by using a pair of urethane blocks 1421a and 1421b facing each other in a horizontal direction.

The second sealer removal module 142 includes a plurality of urethane blocks 1421a and 1421b facing each other in a taper form tilted downward, movable bodies 1422a and 1422b coupling the urethane blocks 1421a and 1421b, respectively, and moving to the left and right, and an actuator 1424 driving the urethane blocks 1421a and 1421b in opposite directions through screws 1423a and 1423b connected to the movable bodies 1422a and 1422b, respectively.

The second sealer removal module 142 usually waits in a state in which the urethane blocks 1421a and 1421b are moved outwards and opened, and when the brush 111 descends through the brushing work tool 110, the second sealer removal module 142 moves the urethane blocks 1421a and 1421b inwards, and presses the front and the back of the brush 111 at a predetermined interval. In this case, the robot 130 raises the brushing work tool 110 to secondarily remove the residual sealer 20b and restore the form of the brush 111 by the contact with the urethane blocks 1421a and 1421b. Thereafter, the second sealer removal module 142 returns the urethane blocks 1421a and 1421b to a waiting state.

The residual sealer remover 140 has an advantage of being capable of physically removing a sealer with a viscosity from the brush 111 without a cleaning device which cleans the brush by using a cleaning solution in the related art, and at the same time, maintaining the form of the brush in a form optimized for the brushing work.

Figure 4:
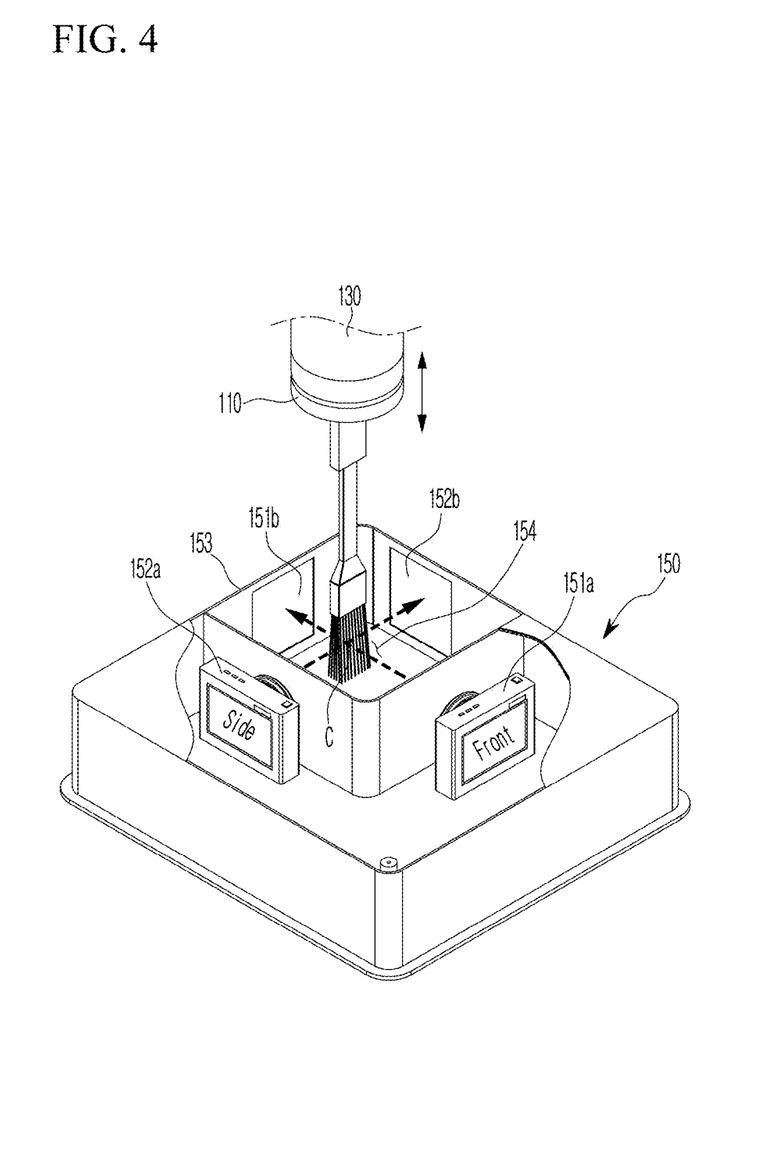
FIG. 4 illustrates a configuration of a brush examiner according to an exemplary embodiment of the present invention.

Meanwhile, FIG. 4 illustrates a configuration of a brush examiner according to an exemplary embodiment of the present invention.

Figure 5:
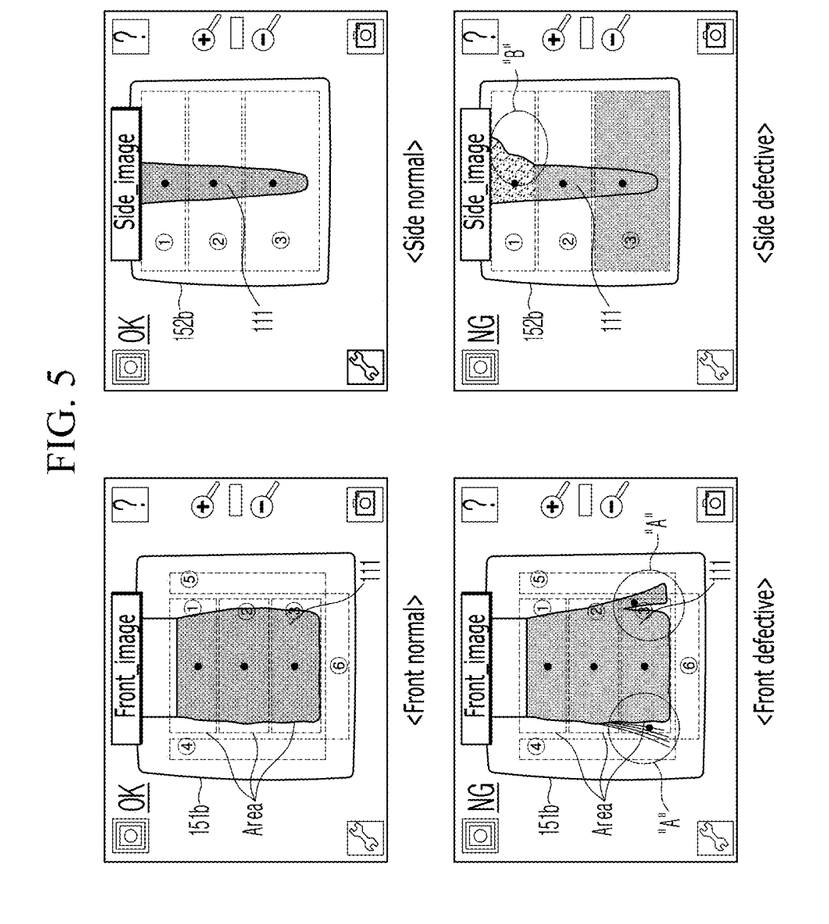
FIG. 5 illustrates a method for determining whether the brush examiner is defective according to an exemplary embodiment of the present invention.

FIG. 5 illustrates a method for determining whether the brush examiner is defective according to an exemplary embodiment of the present invention.

Referring to FIGS. 4 and 5, the robot 130 may examine the state of the brush 111 by moving the brushing work tool 110 to a center C of the brush examiner 150 when completing the residual sealer removal work.

The brush examiner 150 includes a box 153 of which a top is opened to form a box-type space 154, a first camera 151a photographing a front image of a brush 111 positioned at the center and a first backlight 151b emitting light on a rear surface of the brush 111, which are installed on vertical sides of the box 153, respectively, and a second camera 152a photographing a side image of the brush 111 and a second backlight 152b emitting light on the other side of the brush 111.

The first camera 151a and the second camera 152a may measure the number of pixels and a brush area (i.e., a pixel area) of the brush by using a brightness difference due to the backlight 152b in images photographed, respectively, and judge whether the brush state is normal (OK/NG) according to whether the number of pixels and the brush area satisfy reference values for each of a plurality of divided sensing areas in the image.

For example, referring to FIG. 5, a front image and a side image displayed in the first camera 151a and the second camera 152a may set sensing areas divided for examining the brush state, respectively, and reference value conditions, and the brush area (brush image) is represented with a dark color due to the backlights 151b and 152b.

The first camera 151a and the second camera 152a determine a brush area in each sensing area set in each image and a pixel number thereof and judge the brush state by comparing the brush area and the number of pixels with the reference value conditions.

The first camera 151a and the second camera 152a have a first condition for judging that the brush state is normal (OK) when the brush area is within the allowed sensing area.

If a total of 6 sensing areas are present in the front image of the brush 111, and the allowed sensing areas among them are defined as (1, 2), and (3), when the brush area is within the allowed sensing area like "A", it may be judged that the brush state is normal (OK). Accordingly, when the brush area deviates from the allowed sensing area (or when the brush area is sensed in a non-allowed sensing area), it is recognized that the brush is damaged or contaminated to judge that the brush state is defective (NG).

Further, it may be judged whether the brush state is normal (OK/NG) under a second condition in which only one brush area is detected in one sensing area. Since only one brush area for the brush image is present in each of (1, 2, and 3 with respect to a normal image of the front image, it may be judged that the brush state is normal (OK). On the contrary, when two or more brush areas are sensed within one sensing area like "A", it is recognized that the brush is split to judge that the brush state is defective (NG).

Further, as in an examination example for the side image of the brush 111, when the number of pixels of the brush area for each sensing area satisfies a setting reference value, it is judged that the brush state is normal (OK). On the contrary, (1) when the number of pixels of the brush image of the sensing area is more than a setting reference value like "B", it may be judged that the brush state is defective (NG) by recognizing an increase of an area due to sealer contamination.

The above examination example is not limited to the front image and the side image and is applied to both the first camera 151a and the second camera 152a, and when all of the conditions are satisfied, it may be judged that the brush state is normal, and a judgment result may be transferred to the robot controller 172. However, when a brush examination judgment result is defective (NG), the brush examiner 150 may display the brush examination judgment result through a warning light.

Figure 6:
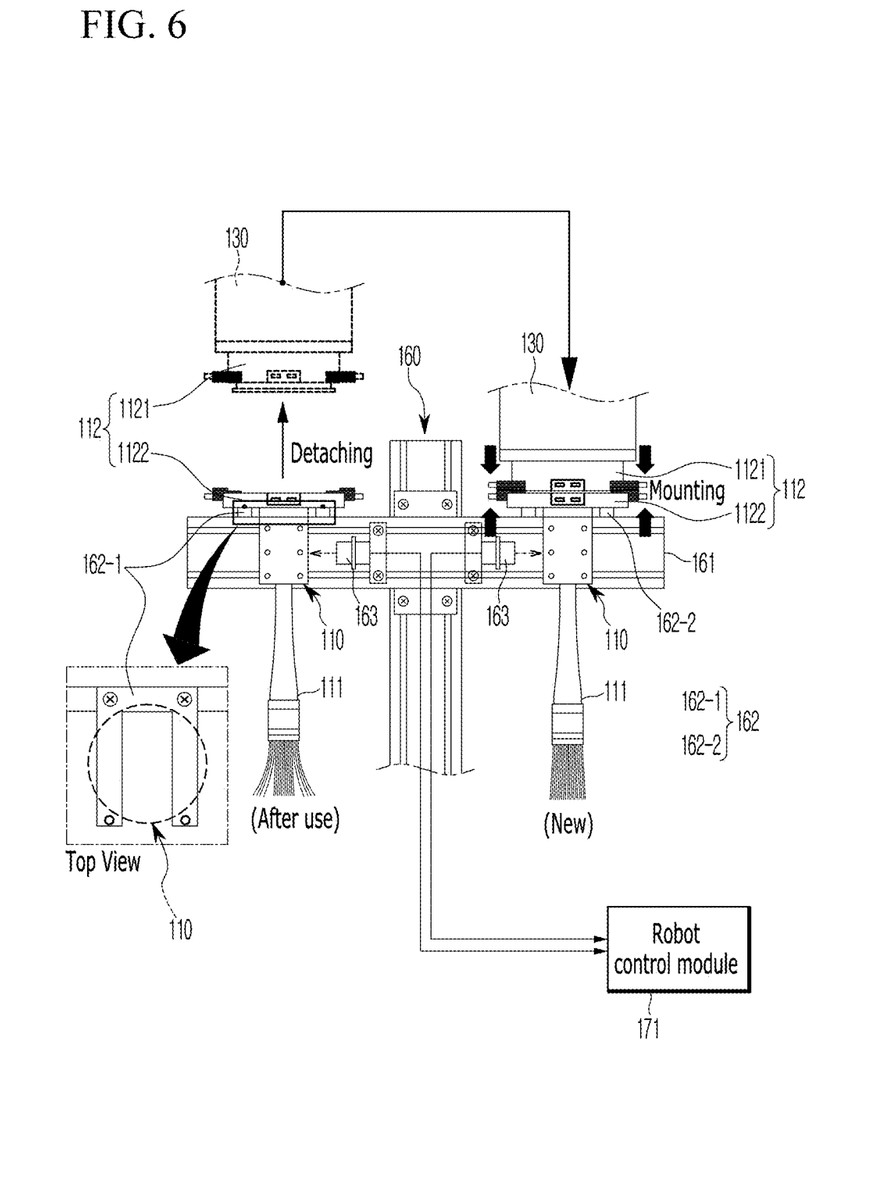
FIG. 6 illustrates a configuration of a tool replacer according to an exemplary embodiment of the present invention.

Meanwhile, FIG. 6 illustrates a configuration of a tool replacer according to an exemplary embodiment of the present invention.

Referring to FIG. 6, the tool replacer 160 includes a plurality of tool stands 162 horizontally disposed in a T-shaped support 161 and forming a seating structure of the brushing work tool 1110 and a proximity sensor 163 sensing whether the brushing work tool 110 is seated (ON/OFF) for each tool stand 162 and transferring whether the brushing work tool 110 is seated to the robot controller 172. In FIG. 6, for convenience of description, it is assumed that there are two tool stands 162, but the number of tool stands is not limited thereto, and the tool stand 162 may be further disposed.

When it is judged that the brush state is defective (NG) as a result of performing the brush examination described above, the robot 130 moves to the tool replacer 160 to detach the existing brushing work tool 110 from an empty first tool stand 162-1, moves to a second tool stand 162-2 to mount a new brushing work tool 110, and returns to a home location. In this case, the existing brushing work tool 110 and the new brushing work tool 110 may be detached from or mounted on the robot 130 through switching functions of the magnets 1123a and 1123b applied to the tool changer 112, respectively.

In this regard, a pneumatic/mechanical (e.g., ball blocking) scheme applied to robot tool replacement in the related art as an expensive system requiring a pneumatic line and an ultra-precision processing process has a problem in that process efficiency deterioration is caused due to complicated wires, ball wear, and durability problems.

Contrary to this, the tool replacer 160 according to an exemplary embodiment of the present invention applies switching magnetic technology through the tool changer 112 to enable full wireless coupling without a complicated pneumatic line and an expensive system and increases process efficiency according to removal of a non-operating element.

Figure 7:
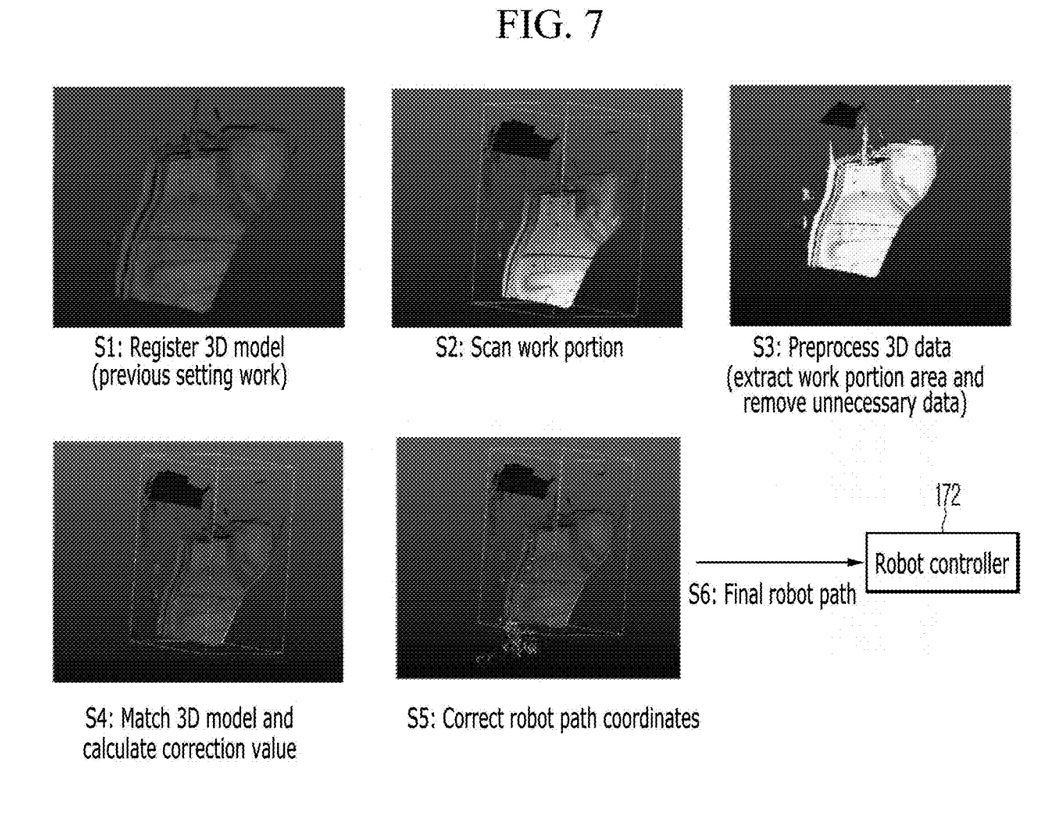
FIG. 7 is a diagram illustrating a robot path generation method for the sealer work according to an exemplary embodiment of the present invention.

Meanwhile, FIG. 7 illustrates a robot path generation method for the sealer work according to an exemplary embodiment of the present invention.

Referring to FIG. 7, the robot path generator 171 according to an exemplary embodiment of the present invention generates a 3D model that sets a robot path required for a brushing work of a vehicle body by using a vision program by a preliminary setting work for the brushing work (S1). The vision program may define the robot path b using 3D design data or a 3D image of the vehicle body.

The robot path generator 171 receives 3D data acquired by scanning a work portion of the vehicle body by using the 3D sensor 120 upon an actual brushing work using the robot 130 (S2) and performs a preprocessing work of extracting a work portion area and removing unnecessary data (e.g., a background) from the 3D data (S3).

The robot path generator 171 matches a 3D model corresponding to the preprocessed 3D data in 3D to calculate a correction value according to generation of a matching error (S4).

The robot path generator 171 displays a predefined robot path in the work portion area of the 3D data and corrects coordinates of the robot path according to a location of the work portion area of the vehicle body (S5).

The robot path generator 171 controls the brushing work of the robot 130 by transferring a corrected final robot path to the robot controller 172 (S6).

In this case, the robot path generator 171 provides a graphical user interface (GUI) which simplifies modification of a robot path of a user (engineer) by using off-line programming (OLP).

Figure 8:
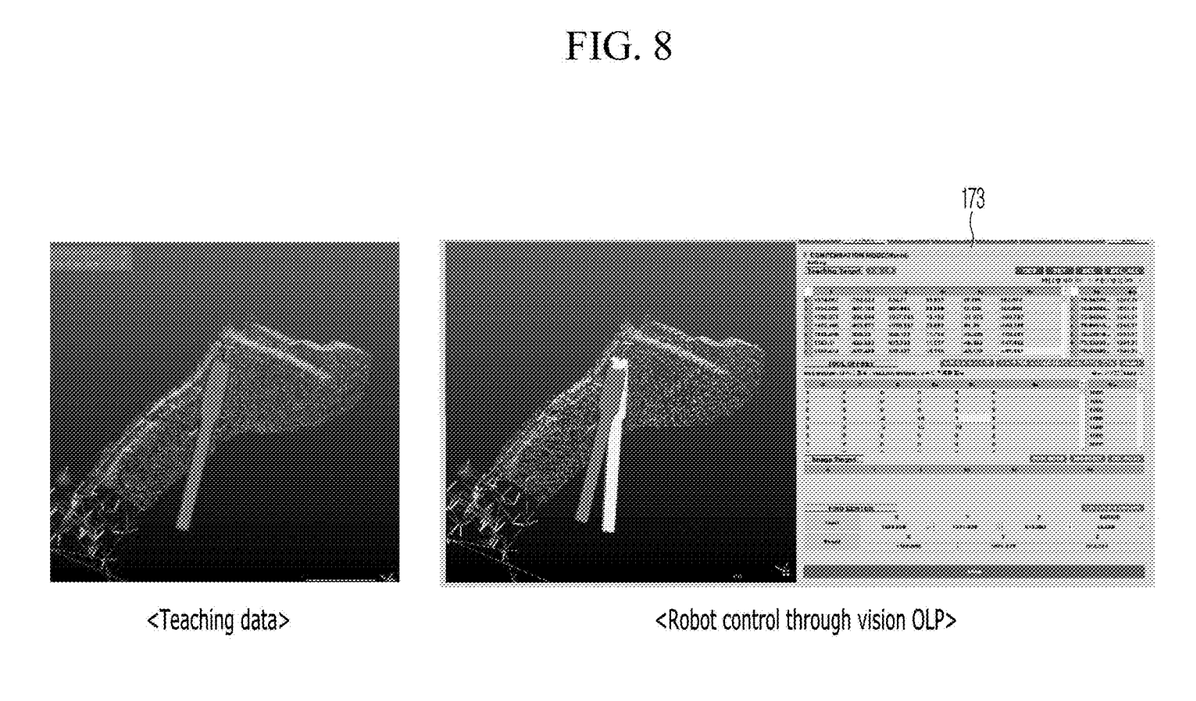
FIG. 8 illustrates a teaching condition database (DB) construction method using an OLP based GUI according to an exemplary embodiment of the present invention.

FIG. 8 illustrates a teaching condition DB construction method using an OLP based GUI according to an exemplary embodiment of the present invention.

Referring to FIG. 8, the robot path generator 171 derives a teaching point in 3D data using the GUI 173 and provides a precise teaching and robot path modification function for each work portion desired by a user.

The robot path generator 171 generates/modifies a robot path such as a dynamic position, a speed, a brush rotation angle (based on an axis), an angle of the brush for a movement direction, a brush depth, etc. based on the robot path for each joint work position by using the GUI 173 and transfers the generated/modified robot path to the robot controller 172.

In particular, a normal coordinate value of a specific point or a desired position for a primary watertight portion work left surface of the vehicle body is formed through the GUI 173, and at least one of a teaching point angle (e.g., based on 1 degree), a brush depth (e.g., based on 1 mm), and a brush rotation angle (e.g., based on 1 degree) is modified based on the normal coordinate to support a precise control of simulating a brushing work skill of a skilled worker.

Therefore, the robot path generator 171 of embodiments of the present invention has an effect of being capable of solving a complicated problem relying on an existing teaching pendant manual work and supporting robot path modification and precise control using the OLP and the GUI.

The robot controller 172 generates a control signal based on the robot path received from the robot path generator 171 to control the brushing work of the robot 130 using the brushing work tool 110.

Further, the robot controller 172 may control at least one operation of a residual sealer removal mode, a brush state examination mode, and a tool replacement mode of the robot 130 for maintenance of the brush state after completing the brushing work.

The robot controller 172 may be implemented by one or more processors which operate by a set program and the set program may be programmed to perform each step of the sealer work automation method using the robot according to an exemplary embodiment of the present invention.

The sealer work automation method using the robot will be described in more detail with reference to FIG. 9 below.

Meanwhile, the robot path generator 171 and the robot controller 172 may be configured as respective independent devices, but they may be integrated as one control system 170 as illustrated in FIG. 1. The control system 170 as a computing system may include hardware, software, and input/output interfaces for brushing work automation using the robot.

Therefore, hereinafter, in describing the sealer work automation method according to an exemplary embodiment of the present invention, a subject thereof will be referred to as the control system 170.

Figure 9:
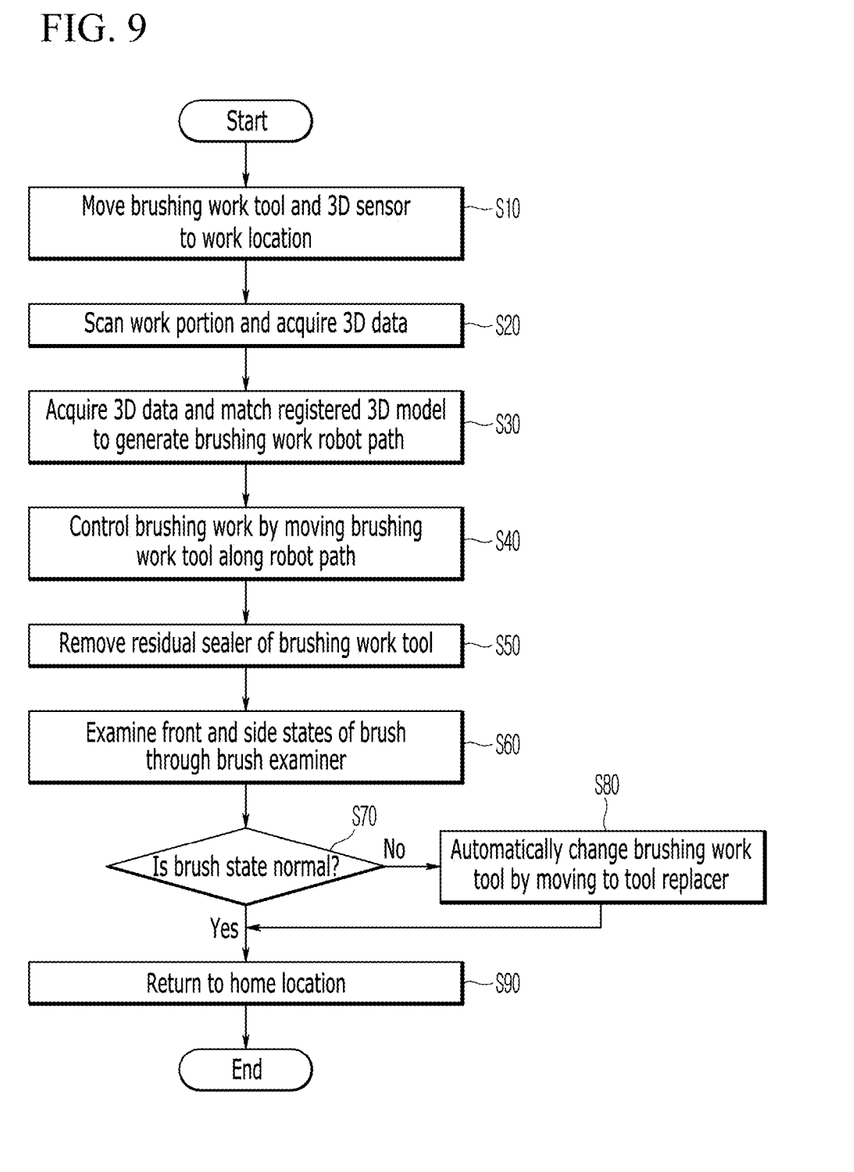
FIG. 9 is a flowchart schematically illustrating a sealer work automation method according to an exemplary embodiment of the present invention.

FIG. 9 is a flowchart schematically illustrating a sealer work automation method using a robot according to an exemplary embodiment of the present invention.

Referring to FIG. 9, the sealer work automation method using the robot according to an exemplary embodiment of the present invention will be described by assuming a state in which the worker applies the sealer to the joints of the vehicle body.

A control system 170 moves a brushing work tool 110 and a 3D sensor 120 mounted on a robot 130 to a work location of an under body (S10).

The control system 170 photographs a work portion of the joint through the 3D sensor 120 mounted on the robot 130 to acquire 3D data (S20).

The control system 170 generates a robot path by matching the 3D data and a 3D model for a brushing work of the joint (S30) and controls a brushing work of spreading a sealer 20a applied to the joint by moving the brushing work tool 110 along the robot path (S40). Here, the robot path generation method may be described with reference to the descriptions through FIGS. 7 and 8.

When the brushing work is completed, the control system 170 moves the brushing work tool 110 to a residual sealer remover 140 to remove a residual sealer 20b stained in a brush 111 and to restore a brush form (S50). Here, a residual sealer removal method may be described with reference to the description through FIG. 3.

The control system 170 photographs a front image and a side image of the brush 111 which removes the residual sealer 20b to examine whether a brush state is normal (OK/NG) based on image sensing (S60). Here, a method for judging whether the brush state is normal may be described with reference to the descriptions through FIGS. 4 and 5.

In this case, the control system 170 judges that the brush state is normal (OK) when both the front image and the side image are normal (Yes in S70) and returns the robot 130 to a set home location (S90).

On the contrary, the control system 170 judges that the brush state is defective (NG), and displays the NG in a warning light when at least one of the front image and the side image is defective (NG) (No in S70).

When judging that the brush state is defective (NG), the control system 170 moves the robot 130 to a tool replacer 160, detaches the defective brushing work tool 110 by a magnetic scheme, then automatically replaces the defective brushing work tool 110 with a new brushing work tool 110, and mounts the new brushing work tool 110 (S80). In addition, the control system 170 may return the robot 130 to a set home location (S90).

As described above, according to an exemplary embodiment of the present invention, there is an effect in which a precise brushing work is controlled through a corrected robot path by mounting a brushing work tool optimized for a brushing work of a sealer on a robot and using a 3D sensor to reduce a manual work cost and uniformize a sealer finishing quality.

Further, there is an effect in which removal of a residual sealer stained in a brush, brush state (form) examination, and an old brushing work tool replacement and mounting process are automated to maintain a form of the brush in a state optimized for the brushing work.

Further, there is an effect in which the brushing work tool is mounted and detached wirelessly by using a tool changer adopting switching magnetic technology to reduce a replacement time and increase process operation efficiency.

The exemplary embodiments of the present invention are not implemented only through the above-described apparatus and/or method, but they may be implemented through a program for implementing functions corresponding to the configuration of the exemplary embodiments of the present invention, a recording medium on which the program is recorded, and the like, and the implementation can be easily achieved by those skilled in the art from the description of the exemplary embodiments described above.

While the exemplary embodiments of the present invention have been described in connection with what is presently considered to be practical exemplary embodiments, it is to be understood that the scope of the present invention is not limited to the disclosed exemplary embodiments, but, on the contrary, it is intended to cover various modifications and equivalent arrangements included within the spirit and scope of the appended claims.

The following reference identifiers may be used in connection with the accompanying drawings to describe various features of embodiments of the present invention.

| | |
|---|---|
| 10: Vehicle body | 20a/20b: Sealer (application/contamination) |
| 100: Sealer work automation system | 110: Brushing work tool |
| 111: Brush | 1111: Brush hair |
| 1112: Brush handle | 112: Tool changer |
| 1121: Main changer | 1122: Sub changer |
| 1123a, 1123b: First, second magnet | 1124: Gripper |
| 120: 3D Sensor | 130: Robot |
| 131: End effector | 140: Residual remover |
| 141: First sealer removal module | 1411: Housing |

-continued

| | |
|---|---|
| 1412: Bar | 142: Second sealer removal module |
| 1421a, 1422b: Urethane block | 1422a, 1422b: Movable body |
| 1423a, 1423b: Screw | 1424: Actuator |
| 150: Brush examiner | 151a, 152a: First, second camera |
| 151b, 152b: First, second backlight | 153: Box |
| 154: Space | 160: Tool replacer |
| 161: Support | 162: Tool stand |
| 163: Proximity sensor | 170: Control system |
| 171: Robot path generator | 172: Robot controller |
| 173: GUI | |

What is claimed is:

1. A sealer work automation method using a robot, the method comprising:
moving a brushing work tool and a three-dimensional (3D) sensor mounted on the robot to a work location of an under body and photographing a work portion of a joint through the 3D sensor to acquire 3D data;
generating a robot path by matching the 3D data and a 3D model for a brushing work of the joint;
controlling the brushing work of spreading a sealer applied to the joint by moving the brushing work tool along the robot path;
moving the brushing work tool to a residual sealer remover to remove a residual sealer stained in a brush of the brushing work tool and to restore a brush form after the brushing work is completed;
photographing, by a brush examiner, front and side images of the brush to judge whether a brush state is normal or defective based on image sensing; and
in a case in which the brush state is judged to be defective, moving the brushing work tool to a tool replacer, detaching the brushing work tool by a magnetic scheme, replacing the brushing work tool with a new brushing work tool, and mounting the new brushing work tool.

2. The method of claim 1, wherein generating the robot path comprises:
generating a 3D model which sets the robot path required for the brushing work of the under body by using a vision program;
performing a preprocessing work of extracting a work portion area from the 3D data and removing unnecessary data upon the brushing work;
matching a 3D model corresponding to the preprocessed 3D data in 3D to calculate a correction value according to generation of a matching error; and
displaying a predefined robot path in the work portion area of the 3D data and correcting coordinates of the robot path according to the work location of the under body.

3. The method of claim 1, wherein removing the residual sealer and restoring the brush form comprises:
primarily removing the residual sealer stained on the brush by physically contacting the brush with a horizontally fixed bar of a first sealer removal module; and
secondarily removing the residual sealer and restoring the brush form by raising the brushing work tool while physically pressing a front and a back of the brush by using urethane blocks of a second sealer removal module, the urethane blocks facing each other in a horizontal direction.

4. The method of claim 1, wherein photographing the front and side images of the brush to judge whether the brush state is normal or defective comprises:
measuring a number of pixels and a brush area of the brush for each of the front image and the side image and judging whether the brush state is normal or defective according to whether the number of pixels and the brush area satisfy set reference values for each of a plurality of divided sensing areas in the respective front or side image; and
judging that the brush state is normal in a case in which:
the brush area is within an allowed sensing area;
only one brush area is detected in any one sensing area; and
the number of pixels of the brush area for each sensing area satisfies the set reference value.

5. The method of claim 1, wherein replacing the brushing work tool with the new brushing work tool and mounting the new brushing work tool comprises:
moving the robot to an empty first tool stand of the tool replacer;
detaching the brushing work tool from the robot; and
mounting the detached brushing work tool on the empty first tool stand;
moving the robot to a second tool stand;
mounting the new brushing work tool on the robot; and
returning the robot to a home location.

6. A sealer work automation system, the system comprising:
a robot configured to perform a brushing work of spreading a sealer applied to a joint by moving a brushing work tool to a work location of an under body;
a three-dimensional (3D) sensor mounted on the robot and configured to photograph a work portion of the joint to acquire 3D data;
a residual sealer remover configured to remove a residual sealer by applying a physical force to a brush of the brushing work tool contaminated after the brushing work;
a robot path generator configured to generate a robot path for the brushing work by matching the 3D data received from the 3D sensor and design data for the brushing work of the joint; and
a robot controller configured to control an overall operation of the robot and to control the brushing work of the robot based on the robot path.

7. The system of claim 6, wherein the brushing work tool comprises:
the brush comprising brush hairs having a form in which a front is flat and a brush handle extending from the brush hair in a longitudinal direction;
a main changer attached to the robot and comprising a first magnet in a lower part; and
a sub changer configured to be mounted on or detached from the main changer by a wireless switching scheme using a second magnet configured in an upper part while coupling the brush through a gripper.

8. The system of claim 6, wherein the 3D sensor is configured to:
scan the work portion through a 3D scan camera capable of recognizing a depth to generate the 3D data; and
transfer the generated 3D data to the robot path generator to recognize a shape of the work portion and the joint to which the sealer is to be applied.

9. The system of claim 6, wherein the robot is configured to:
control a scan angle of the 3D sensor by rotating an end effector according to the work portion; and
control an angle of the brush in a brushing direction of the joint by rotating the end effector upon the brushing work.

10. The system of claim 6, wherein the residual sealer remover comprises:
a first sealer removal module comprising a bar horizontally fixed to an inner wall of a housing of which a top is opened, the first sealer removal module being configured to move horizontally to primarily remove the residual sealer of the brush through physical contact; and
a second sealer removal module configured to secondarily remove the residual sealer and to restore a brush form by an operation of raising the brushing work tool while physically pressing a front and a back of the brush by using urethane blocks facing each other in a horizontal direction.

11. The system of claim 10, wherein the second sealer removal module comprises:
the urethane blocks facing each other in a tapered form tilted downwards;
movable bodies coupling the urethane blocks, respectively, and configured to move in left direction and a right direction; and
an actuator configured to drive the urethane blocks in opposite directions through screws connected to the respective movable bodies.

12. The system of claim 6, wherein the robot path generator is configured to:
generate a 3D model that sets the robot path required for the brushing work of the under body by using a vision program by a preliminary setting work for the brushing work;
calculate a correction value according to generation of a matching error by preprocessing the 3D data received upon an actual brushing work;
match the 3D model;
display a predefined robot path at a work portion area of the 3D data; and
correct coordinates of the robot path according to the work location of the under body.

13. The system of claim 6, wherein the robot path generator is configured to:
provide a graphical user interface (GUI) which simplifies modification of the robot path by a user by using off-line programming;
derive a teaching point in the 3D data using the GUI; and
provide a precise teaching and robot path modification function for each work portion identified by the user.

14. The system of claim 13, wherein the robot path generator is configured to:
form a normal coordinate value of a specific point or a desired position for a primary watertight portion work left surface of the under body through the GUI; and
modify a teaching point angle, a brush depth, or a brush rotation angle based on the normal coordinate to support a precise control of simulating a brushing work skill of a skilled worker.

15. The system of claim 6, wherein the robot controller is configured to:
generate a control signal based on the robot path received from the robot path generator to control the brushing work of the robot; and
control a residual sealer removal mode, a brush state examination mode, or a tool change mode of the robot for maintenance of a brush state after completing the brushing work.

16. A sealer work automation system, the system comprising:
a robot configured to perform a brushing work of spreading a sealer applied to a joint by moving a brushing work tool to an under body;
a three-dimensional (3D) sensor mounted on the robot and configured to photograph a work portion of the joint to acquire 3D data;
a residual sealer remover configured to remove a residual sealer by applying a physical force to a brush of the brushing work tool contaminated after the brushing work;
a robot path generator configured to generate a brushing work robot path by matching the 3D data received from the 3D sensor and design data for the brushing work of the joint;
a robot controller configured to control an overall operation of the robot and to control the brushing work of the robot based on the robot path;
a brush examiner configured to photograph a front image and a side image of the brush from which the residual sealer is removed to judge whether a brush state is normal or defective based on image sensing; and
a tool replacer configured to recover the brushing work tool including the brush judged to be defective from the robot and supply a new brushing work tool to replace the recovered brushing work tool.

17. The system of claim 16, wherein the brush examiner comprises:
a box of which a top is opened to define a box-type space;
a first camera disposed on a first vertical side surface of the box and configured to photograph the front image of the brush positioned at a center;
a first backlight disposed on a second first vertical side surface of the box and configured to emit light from a rear surface of the brush;
a second camera configured to photograph the side image of a first side of the brush; and
a second backlight configured to emit light from a second side of the brush.

18. The system of claim 17, wherein the first camera and the second camera each are configured to:
measure a number of pixels and a brush area of the brush by using a brightness difference by the first backlight or the second backlight in the respective front or side image; and
judge whether the brush state is normal or defective according to whether the number of pixels and the brush area satisfy set reference values for each of a plurality of divided sensing areas in the respective front or side image.

19. The system of claim 18, wherein the first camera and the second camera are configured to judge that the brush state is normal in a case in which:

the brush area is within an allowed sensing area;
only one brush area is detected in any one sensing area; and
the number of pixels of the brush area for each sensing area satisfies the set reference value.

20. The system of claim 16, wherein the tool replacer comprises:
a plurality of tool stands horizontally disposed on a T-shaped support and defining a seating structure of the brushing work tool; and
a proximity sensor configured to sense whether the brushing work tool is seated for each tool stand and to transfer whether the brushing work tool is seated for each tool stand to the robot controller.

* * * * *

UNITED STATES PATENT AND TRADEMARK OFFICE
CERTIFICATE OF CORRECTION

| | | |
|---|---|---|
| PATENT NO. | : 12,466,081 B2 | Page 1 of 1 |
| APPLICATION NO. | : 18/643259 | |
| DATED | : November 11, 2025 | |
| INVENTOR(S) | : Kim et al. | |

It is certified that error appears in the above-identified patent and that said Letters Patent is hereby corrected as shown below:

On the Title Page

Item (72), in Column 1, in "Inventors", Line 2, delete "Kwangro" and insert -- KwangRo --.

Signed and Sealed this
Sixth Day of January, 2026

John A. Squires
*Director of the United States Patent and Trademark Office*